United States Patent Office 3,583,867
Patented June 8, 1971

3,583,867
COMPOSITIONS FOR AND METHOD OF DISSOLVING NICKEL
Leo J. Slominski, Bristol, and Dilip G. Shah, Wolcott, Conn., assignors to MacDermid Incorporated, Waterbury, Conn.
No Drawing. Filed May 10, 1968, Ser. No. 728,308
Int. Cl. C22b 23/04
U.S. Cl. 75—119                                  10 Claims

ABSTRACT OF THE DISCLOSURE

A nickel stripping composition comprising a polyphosphate, a nitro-organic compound and a base to render the composition definitely alkaline in solution, wherein the composition is modified by the inclusion of a thiosulfate to make it more or less selective in stripping nickel in the presence of copper or other metals which have a tendency to inhibit the stripping action, and wherein there is also included a soluble sulfite to afford prolonged high temperature operation of the stripping bath without decomposition.

---

This invention is directed to chemical dissolution of a metal, and more particularly to chemically stripping nickel deposits from substrates on which the nickel has been plated or otherwise applied.

A variety of articles in the hardware, automotive and appliance industries, for example, are commonly given a plate or coating of nickel, sometimes alone but generally in conjunction with other metals to provide a protective and decorative finish. For one reason or another almost invariably there are articles on which the nickel deposit is defective, rendering those articles unacceptable commercially. Nevertheless there is frequently a substantial economic value in the articles themselves if they can be salvaged by removing the defective plat. Accordingly there is extensive need in such industrial operations for an inexpensive and easily controlled method of removing the nickel plate.

There have been a number of systems devised and used heretofore for stripping nickel deposits from articles, including cyanide compounds, mineral acids or strong caustics, as well as a number of other systems which are not subject to the health hazards of the cyanide compounds or the highly corrosive action of the acid or caustic systems. Among the latter type there is disclosed in the prior application of Grunwald and Slominski, Ser. No. 650,177, filed June 30, 1967, now U.S. Pat. No. 3,460,938, issued Aug. 12, 1969, an improved nickel-copper stripping composition employing a nitro-substituted organic compound, a base such as ammonia or an amine, in conjunction with a water soluble polyphosphate as the main complexer for nickel, and a thiosulfate compound. The thiosulfate compound has a certain catalytic effect in the system but is used primarily as a complexer for removing copper and possibly other metal ions such as zinc which interfere with the dissolution of the nickel and which are unavoidably present in solution on account of the metal itself being present in the article to be stripped of nickel.

The present invention is a modification and improvement of the system disclosed and claimed in the aforesaid application Ser. No. 650,177, whereby improved nickel stripping rates are obtained at low or room temperature and the system has greater stability at high operating temperatures. Since the new stripping composition can also be used at elevated temperatures without sacrificing stability, marked increase in the nickel stripping or dissolution rate can thus be accomplished. Another advantage of the new system is that little or no smut remains on the substrate or work itself after the nickel has been stripped from it.

The foregoing improvement is obtained by incorporating sulfite ions in the aforesaid stripping composition. The sulfite ions can be introduced as a soluble salt or a mixture of salts of sulfurous acid, the cations of which do not interfere with normal performance of the other ingredients in the stripping solution. Examples of such salts of sulfurous include sodium sulfite, potassium sulfite, ammonium sulfite, lithium sulfite, and the bisulfites of the above cations.

Although optimum concentration of the sulfite ion has been found to be on the order of 0.15/M, concentrations as low as 0.010/M and as high as 0.50/M are operative.

The other components in the system may be used at any of the concentrations disclosed in the aforesaid copending application Ser. No. 650,177 to be applicable to nickel stripping. Thus the pyrophosphate concentration may range up to 0.5/M, with the nickel stripping rate increasing proportionately to the pyrophosphate concentration.

The various nitro-substituted organic oxidizers described in the earlier application may be used as before up to the limit of their solubility. These include the aromatic compounds such as the nitrobenzoic acids, nitrophenols, nitroanilines, and mixtures of these, all being characterized by the presence of at least one nitro group attached to the benzene ring which ring also carries a radical having a solubilizing effect on the nitro-substituted aromatic compound. Nitro-substituted aliphatic compounds may also be employed, the more useful ones being the nitromethanes, nitroethanes and nitropropanes, i.e. those having from about 1 to 3 carbons in the chain. These may be substituted in the mono-, di-, and tri-positions with other solubilizing radicals.

Ammonia or ammonium hydroxide is the preferred base but ethylene diamine may be used. Its presence in solution is needed in amount sufficient to produce a pH of from around 8.5 to 11.0.

Thiosulfate is used up to the limit of its solubility in the solution, as described in the aforesaid application Ser. No. 650,177.

The operating temperature of the stripping solution is not critical and the rate of dissolution of nickel is proportional to the operating temperature. However, at temperatures below 80° F., the rate of dissolution is too low for most practical commercial applications, and at temperatures above 150° F. ammonia loss is excessive without any significant gain in stripping speed. Therefore, the composition should be used between the indicated temperature limits for maximum benefits.

The improved composition dissolves nickel satisfactorily between pH 8.5 and 11.0, as mentioned above, when used within the given temperature limits. However, below pH 9.0, some steels are susceptible to attack, while above pH 10.0, the ammonia loss may be excessive. Accordingly, the pH of the bath should preferably be maintained between about 9.0 and 10.0 for maximum overall efficiency although the rate of dissolution of nickel is directly proportional to the pH.

An eminently satisfactory composition, on a dry basis prior to the addition of the base, comprises the following ingredients:

| | Percent by wt. |
|---|---|
| Sodium-m-nitrobenzene sulfonate | 25.8 |
| Disodium dihydrogen pyrophosphate | 51.0 |
| Sodium thiosulfate | 14.5 |
| Sodium sulfite | 8.7 |

Although a concentration of as low as 4 ounces of this composition per gallon of solution is operative in practice, the preferred concentration range is from about 1.8 to 2.0 pounds per gallon. The rate of dissolution of nickel, and the capacity of the solution for dissolving nickel, are both proportional to the concentration.

As used in the stripping solution, the composition just described is accompanied by a suitable base such as ammonium hydroxide alone or with ammonium salts such as ammonium carbonate or ammonium bicarbonate; alternatively amines such as ethylene diamine may be used to produce a pH within the indicated range. Mixtures of the various bases may be employed to adjust or control the pH.

As illustrations of the use nickel stripping solutions within the scope of this invention, the following specific examples are given as typical.

EXAMPLE I

An aqueous nickel stripping solution was prepared having the following composition:

|  | M |
|---|---|
| Sodium-m-nitrobenzene sulfonate | 0.25 |
| Disodium dihydrogen pyrophosphate | 0.50 |
| Sodium thiosulfate | 0.20 |
| Sodium sulfite | 0.10 |
| Ammonium hydroxide | [1] Approx. 1.00 |

[1] To give a solution pH of 9.5.

Nickel plated steel panels and unplated copper panels were alternately immersed in the above solution for 30 minutes at 120° F. The operations were carried on progressively, using first a nickel plated steel panel and then an unplated copper panel at each stated interval of elapsed time for the bath. In several instances two consecutive nickel dissolution rated terminations of 30 minutes each were run before the copper panel was immersed to determine the copper dissolution rate. And when it became apparent that the copper in the solution was not preventing continued activity of the bath in dissolving nickel, the introduction of the unplated copper panels into the bath was discontinued and the test continued using only the nickel plated panels. The results are tabulated in Table I which gives the rates of dissolution at the various levels of nickel and copper ions in the bath, and an indication of bath life.

TABLE I

| Time, hours | Type of panel | Metal ions in solution, grams/liter | | Rate of dissolution, mils/hour | |
|---|---|---|---|---|---|
| | | Ni | Cu | Ni | Cu |
| 00.00 | Ni | 0.00 | 0.00 | 1.3629 | |
| | Cu | 1.925 | 0.00 | | 0.04248 |
| 24.00 | Ni | 1.925 | 0.06 | 0.7894 | |
| | Cu | 3.040 | 0.06 | | 0.04248 |
| 48.00 | Ni | 3.040 | 0.12 | 0.7151 | |
| | Ni | 4.050 | 0.12 | 0.7859 | |
| | Cu | 5.160 | 0.12 | | 0.10266 |
| 72.00 | Ni | 5.160 | 0.265 | 0.9735 | |
| | Ni | 6.535 | 0.265 | 0.8815 | |
| | Cu | 7.780 | 0.265 | | 0.10266 |
| 96.00 | Ni | 7.780 | 0.410 | 0.8284 | |
| | Cu | 8.950 | 0.410 | | 0.0885 |
| 168.00 | Ni | 8.950 | 0.535 | 0.6372 | |
| 264.00 | Ni | 9.850 | 0.535 | 0.7470 | |
| 336.00 | Ni | 10.905 | 0.535 | 0.6974 | |
| 360.00 | Ni | 11.890 | 0.535 | 0.7080 | |
| | Ni | 12.890 | 0.535 | 0.5664 | |

It is apparent from the foregoing Table I that the system is quite stable at the operating temperature of 120° F.

EXAMPLE II

The same composition as that disclosed in Example I is again employed to illustrate the effect of temperature on rate of dissolution of nickel, the stability of the system at elevated temperature, and to provide a comparison with a solution otherwise identical but omitting the sulfite compound. Nickel plated steel panels were used in the tests. The results are shown in Table II.

TABLE II

| | Rate, mils/hour | |
|---|---|---|
| | Without sulfite | With sulfite |
| Temperature, ° F.: | | |
| 70 | 0.198 | 0.212 |
| 80 | 0.198 | 0.290 |
| 90 | 0.467 | 0.474 |
| 100 | 0.650 | 0.670 |
| 110 | 0.846 | 0.940 |
| 120 | 1.048 | 1.200 |
| 130 | 1.182 | 1.324 |
| 140 | 0.940 | 1.409 |
| 150 | 1.016 | 1.441 |
| 160 | 0.269 | 1.359 |

The results of Table II show that the nickel stripping action with sulfite ion present has higher rate of dissolution of nickel and is more stable than the non-sulfite containing solution at any given temperature, but particularly at the high and low ends of the temperature range.

EXAMPLE III

A nickel stripping solution was prepared having the following composition:

|  | M |
|---|---|
| Sodium-m-nitrobenzene sulfonate | 0.25 |
| Disodium dihydrogen pyrophosphate | 0.50 |
| Sodium thiosulfate | 0.20 |
| Ammonium hydroxide | [1] Varied |

[1] To adjust pH to different values.

Rates of dissolution of nickel were determined by immersing nickel plated steel panels in the foregoing solution at 120° F. for thirty minutes at the various pH levels. The results are shown in Table III.

TABLE III

| Solution pH: | Nickel dissolution rate mil/hour |
|---|---|
| 8.0 | 0.358 |
| 8.5 | 0.708 |
| 9.0 | 1.175 |
| 9.5 | 1.232 |
| 10.0 | 1.490 |

The results given in Table III show that the rate of dissolution of nickel is directly proportional to solution pH.

EXAMPLE IV

A thirty gallon production bath was made up having the following composition:

|  | M |
|---|---|
| Sodium-m-nitrobenzene sulfonate | 0.25 |
| Sodium acid pyrophosphate | 0.50 |
| Sodium thiosulfate | 0.20 |
| Sodium sulfite | 0.15 |
| Ammonium hydroxide | [1] Approximately 1.00 |

[1] To provide pH 9.0.

The bath was operated in uncovered condition at approximately 120° F. Nickel plated steel parts, copper-strike/nickel-plated steel parts and electroless nickel plated steel and aluminum parts were stripped in the tank. The bath was stable for a period of several weeks under continuous operation. Electroless nickel plated steel having a nickel deposit of 2 mil thickness was stripped of all nickel in 4 to 4½ hours, while similar parts containing a nickel deposit of 6 mil thickness could be completely stripped in 16 hours.

Although the foregoing examples employ sodium sulfite as the soluble source of sulfite ion, any of the other commonly available soluble sulfites are equally operative, as previously described hereinabove.

The same observation also applies to the nitro-organic oxidizing compound, the pyrophosphate and the thiosulfate, as any of the various sources of these materials disclosed in the aforesaid application Ser. No. 650,177 may

What is claimed is:
1. A composition for use in aqueous solution for selectively dissolving nickel in the presence of other metals, said composition consisting essentially of
   (a) a water soluble polyphosphate of the group consisting of the sodium, potassium, ammonium and lithium salts and mixtures thereof;
   (b) an organic oxidizer of the group consisting of nitro-substituted aromatic compounds containing at least one nitro group attached to a benzene ring which ring also carries a radical having a water-solublizing effect on the aromatic compound, and water soluble nitro-substituted aliphatic compounds having from 1 to 3 carbons in the chain;
   (c) a base of the group consisting of ammonium hydroxide and ethylenediamine;
   (d) a thiosulfate compound of the group consisting of the sodium, potassium, ammonium, lithium salts and mixtures thereof; and
   (e) a soluble source of sulfite ions;
said polyphosphate and oxidizer being present in substantially stoichiometric amounts up to the limiting solubility of the polyphosphate, and said base being present in amount sufficient to produce a pH of 8.5 to 11 when said composition is in solution; said thiosulfate being present in small but effective amount up to the limit of its solubility; and said soluble sulfite being present in amount to provide a sulfite ion concentration of at least 0.010 M.

2. A composition as defined in claim 1, wherein the sulfite ion concentration is from about 0.010 M to 0.50 M.

3. A composition as defined in claim 2, wherein the sulfite ion concentration is approximately 0.15 M.

4. A composition as defined in claim 1, which consists essentially of sodium acid pyrophosphate, sodium nitrobenzene sulfonate, sodium thiosulfate, ammonium hydroxide and sodium sulfite.

5. A composition as defined in claim 4, wherein the sodium acid, pyrophosphate is about 0.5 M, the sodium nitrobenzene sulfonate is about 0.25 M; the sodium thiosulfate is about 0.2 to 1.5 M; the ammonium hydroxide is about 1.0 M; and the sodium sulfite is from 0.010 M to 0.50 M.

6. The method of selectively dissolving nickel from a nickel-containing article in which other metals may be present, which comprises immersing the article in an aqueous solution consisting essentially of
   (a) a water soluble polyphosphate compound of the group consisting of the sodium, potassium, ammonium, lithium salts and mixture thereof;
   (b) an organic oxidizing agent of the group consisting of the nitro-substituted aromatic compounds containing at least one nitro group attached to a benzene ring which ring also carries a radical having a water solubilizing effect on the aromatic compound, and water-soluble nitro-substituted aliphatic compounds having from 1 to 3 carbons;
   (c) a base of the group consisting of ammonium hydroxide and ethylenediamine;
   (d) a thiosulfate compound of the group consisting of the sodium, potassium, ammonium, lithium salts of said compound and mixtures thereof;
   (e) a soluble source of sulfite ions;
said polyphosphate and oxidizer being present in substantially stoichiometric amounts up to the limiting solubility of the polyphosphate, said base being present in amount to produce a solution pH of 8.5 to 11; said thiosulfate being present in small but effective amount up to the limit of its solubility; and said soluble sulfite source being present in amount of at least 0.010 M; maintaining said solution between ambient room temperature and about 150° F.; maintaining said article immersed in said solution for a time sufficient to dissolve the nickel and then withdrawing the article from said solution.

7. The method as defined in claim 6, wherein the sulfite ion concentration is about 0.010 M to 0.50 M.

8. The method as defined in claim 7, wherein the sulfite ion concentration is approximately 0.15 M.

9. The method as defined in claim 6, wherein said aqueous solution consists essentially of sodium acid pyrophosphate, sodium nitrobenzene sulfonate, sodium thiosulfate, ammonium hydroxide and sodium sulfite.

10. The method as defined in claim 9, wherein the sodium acid pyrophosphate is about 0.5 M; the sodium nitrobenzene sulfonate is about 0.25 M; the sodium thiosulfate is about 0.2 to 1.5 M; the ammonium hydroxide is about 1.0 M; and the sodium sulfite is from 0.010 M to 0.5 M.

References Cited

UNITED STATES PATENTS

| | | | |
|---|---|---|---|
| 2,928,732 | 3/1960 | Bare, et al. | 75—119 |
| 2,937,940 | 5/1960 | Weisberg | 75—97 |
| 3,055,754 | 9/1962 | Fletcher | 75—97 |
| 3,102,808 | 9/1963 | Weisberg | 75—97 |
| 3,104,167 | 9/1963 | Cotteta | 75—97 |
| 3,109,732 | 11/1963 | Goren | 75—101 |
| 3,245,780 | 4/1966 | Weisberg | 75—119X |
| 2,727,818 | 12/1955 | Kenny | 75—117X |
| 3,163,524 | 12/1964 | Weisberg | 75—119X |
| 3,203,787 | 8/1965 | Grunwald (I) | 75—119X |
| 3,460,938 | 8/1969 | Grunwald (II) | 75—97 |

L. DEWAYNE RUTLEDGE, Primary Examiner

J. E. LEGRU, Assistant Examiner

U.S. Cl. X.R.

75—97, 101; 252—102